(12) United States Patent
Park et al.

(10) Patent No.: US 11,894,956 B2
(45) Date of Patent: Feb. 6, 2024

(54) CONTINUOUS TIME LINEAR EQUALIZER WITH A PLURALITY OF SIGNAL PATHS

(71) Applicant: MediaTek Singapore Pte. Ltd., Singapore (SG)

(72) Inventors: Henry Arnold Park, San Jose, CA (US); Qaiser Nehal, San Jose, CA (US); Tamer Mohammed Ali, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/675,177

(22) Filed: Feb. 18, 2022

(65) Prior Publication Data
US 2023/0025012 A1 Jan. 26, 2023

Related U.S. Application Data

(60) Provisional application No. 63/224,906, filed on Jul. 23, 2021.

(51) Int. Cl.
*H04L 25/03* (2006.01)

(52) U.S. Cl.
CPC .. *H04L 25/03885* (2013.01); *H04L 25/03019* (2013.01)

(58) Field of Classification Search
CPC ........ H04L 25/03006; H04L 25/03019; H04L 25/03057; H04L 25/03076; H04L 25/03114; H04L 25/03146; H04L 25/03885
USPC .......................... 375/229, 232; 708/322, 323
See application file for complete search history.

(56) References Cited

U.S. PATENT DOCUMENTS

| | | | | |
|---|---|---|---|---|
| 6,137,356 A | * | 10/2000 | Sakuragi | H03F 1/086 330/136 |
| 9,806,915 B1 | * | 10/2017 | Elzeftawi | H04L 25/03019 |
| 2013/0207722 A1 | | 8/2013 | Bulzacchelli et al. | |
| 2014/0064351 A1 | * | 3/2014 | Hidaka | H04L 27/01 375/232 |
| 2017/0026013 A1 | * | 1/2017 | Hellberg | H03F 3/602 |
| 2017/0126443 A1 | * | 5/2017 | Gu | H03F 3/193 |

(Continued)

FOREIGN PATENT DOCUMENTS

CN 105425888 A * 3/2016

OTHER PUBLICATIONS

Extended European Search Report dated Jul. 28, 2022 in connection with European Application No. 22160401.0.

(Continued)

*Primary Examiner* — Young T. Tse
(74) *Attorney, Agent, or Firm* — Wolf, Greenfield & Sacks, P.C.

(57) ABSTRACT

A continuous time linear equalizer (CTLE) includes a first circuit path having a step response that increases from an first initial value to a steady state value higher than the first initial value. The CTLE also includes a second circuit path in parallel with the first circuit path, the second circuit path having a step response that increases from a second initial value to a peak and subsequently falls to second steady state value that is approximately equal to the second initial value. The CTLE is configured to combine an output of the first circuit path and an output of the second circuit path.

20 Claims, 6 Drawing Sheets

(56) References Cited

U.S. PATENT DOCUMENTS

2021/0359884 A1* 11/2021 Delshadpour ............ H03F 1/42

OTHER PUBLICATIONS

Delshadpour et al., A 20.6 Gb/s Programmable Peaking Gain CTLE. 2020 IEEE 63rd International Midwest Symposium on Circuits and Systems (MWSCAS) Aug. 9, 2020:762-65.

Frans et al., A 56-Gb/s PAM4 wireline transceiver using a 32-way time-interleaved SAR ADC in 16-nm FinFET. IEEE journal of solid-state circuits. Jan. 9, 2017;52(4):1101-10.

Krupnik et al., 112 Gb/s PAM4 ADC based SERDES receiver for long-reach channels in 10nm process. IEEE 2019 Symposium on VLSI Circuits Jun. 9, 2019: C266-C267.

* cited by examiner

PMOS

NMOS

CONTINUOUS TIME LINEAR EQUALIZER WITH A PLURALITY OF SIGNAL PATHS

CROSS-REFERENCE TO RELATED APPLICATIONS

This application claims priority to U.S. Provisional Application Ser. No. 63/224,906, filed Jul. 23, 2021, titled "CONTINUOUS TIME LINEAR EQUALIZER WITH LC RESONATOR," which is hereby incorporated by reference in its entirety.

BACKGROUND

1. Technical Field

The techniques described herein relate generally to continuous time linear equalizers.

2. Discussion of the Related Art

Signal power is lost as signals propagate through a channel. Continuous time linear equalizers (CTLEs) are circuits that can compensate for the loss of signal power.

SUMMARY

A continuous time linear equalizer (CTLE) may include a first circuit path having a step response that increases from an first initial value to a steady state value higher than the first initial value. The CTLE also includes a second circuit path in parallel with the first circuit path, the second circuit path having a step response that increases from a second initial value to a peak and subsequently falls to second steady state value that is approximately equal to the second initial value. The CTLE is configured to combine an output of the first circuit path and an output of the second circuit path.

The CTLE may be configured to receive a signal transmitted through a wired connection that provides a channel for the signal.

A frequency response of the CTLE may be inversely proportional to a frequency response of the channel.

The step response of the first circuit path may have an overshoot that peaks before falling to the steady state value.

The first circuit path may include a transconductance (Gm) cell.

The Gm cell may perform a voltage to current conversion.

The Gm cell may be a first Gm cell, the first circuit path may include a first load coupled to an output of the Gm cell, and the first circuit path may include a second Gm cell that receives a signal from the first load.

The Gm cell may include a source degenerated differential pair.

The second circuit path may be programmable to vary a step response of the second circuit path.

The second circuit path may include a tank circuit.

The tank circuit may include a programmable resistance.

The programmable resistance may set a height of the step response of the second circuit path.

The tank circuit may include a programmable capacitance.

The programmable capacitance may set a pulse width of the step response of the second circuit path.

The second circuit path may include a first Gm cell having an output coupled to the tank circuit and a second Gm cell having an input connected to the tank circuit.

The CTLE may further comprise a summing circuit configured to combine an output of the first circuit path and an output of the second circuit path to produce a combined output.

The first Gm cell and/or the second Gm cell may comprise a differential pair.

The CTLE may further comprise a summing circuit configured to combine an output of the first circuit path and an output of the second circuit path to produce a combined output.

A continuous time linear equalizer (CTLE) may comprise a first circuit path; and a second circuit path in parallel with the first circuit path, the second circuit path having a step response with an overshoot, wherein the CTLE is configured to combine an output of the first circuit path and an output of the second circuit path.

The first circuit path may comprise a wideband amplifier or a wideband equalizer.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Figure 1:
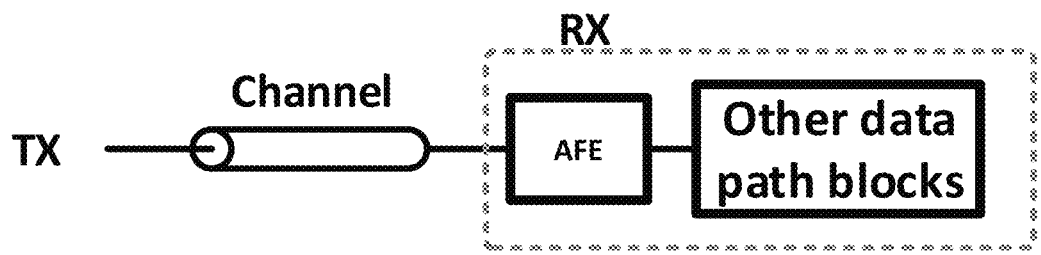
FIG. 1 illustrates a transmitter TX may transmit an electrical signal through a hard-wired channel.
Figure 2:
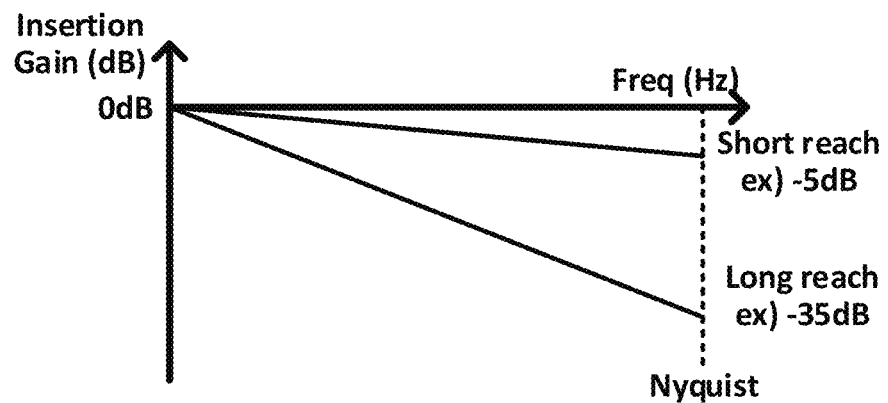
FIG. 2. shows the channel has a frequency-dependent gain that decreases at higher frequencies.
Figure 3:
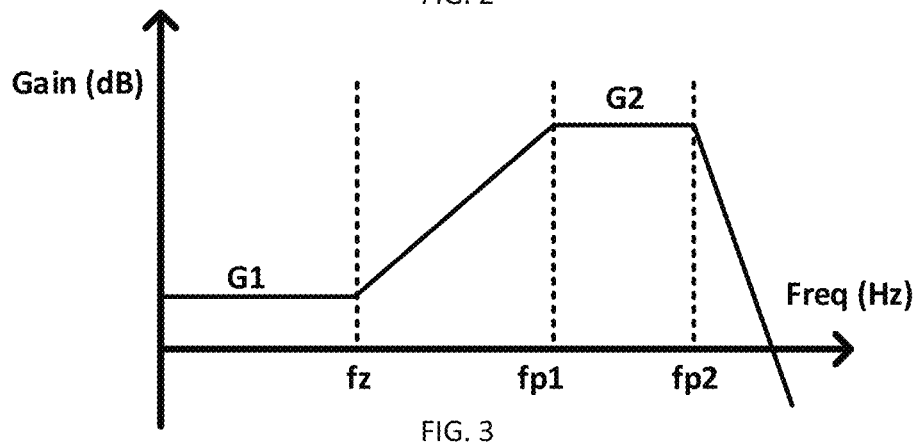
FIG. 3. shows a CTLE may have a desired frequency-dependent gain that increases with frequency.

CTLEs may be used in a variety of applications to compensate for the power losses as a signal propagates through a channel. For example, as illustrated in FIG. 1, a transmitter TX may transmit an electrical signal through a hard-wired channel to an analog front-end (AFE), which may include a CTLE. The channel has a frequency-dependent gain that decreases at higher frequencies, as shown in FIG. 2. A short reach channel may have a relatively low insertion loss (e.g., −5 dB) at the Nyquist frequency, while long reach channel may have a higher insertion loss (e.g., −35 dB) at the Nyquist frequency. To compensate for the frequency-dependent gain of the channel, a CTLE may be included in the receiver (RX). The CTLE may have a desired frequency-dependent gain that increases with frequency, as shown in FIG. 3. As shown in FIG. 3, the gain of the CTLE increases from a gain of G1 to G2 between frequencies fz and fp1.

The inventors have recognized and appreciated that prior CTLEs may be power hungry, may distort the received signal, and/or may produce excessive ringing that degrades a system's bit error rate. Further, prior CTLEs may lack the flexibility to handle a wide range of data transmission rates such as 10 Gbps to 112 Gbps.

Figure 4:
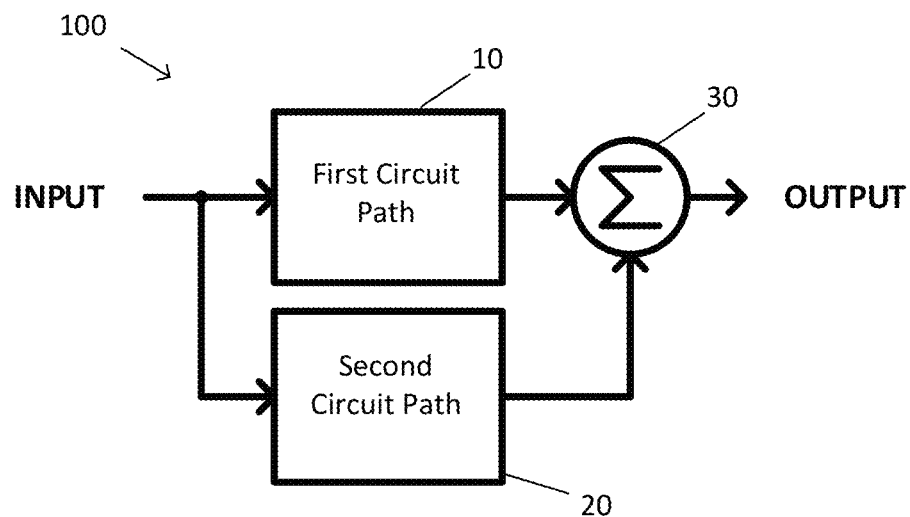
FIG. 4 shows a CTLE that includes a first circuit path, a second circuit path, and a summing circuit, according to some embodiments.
Figure 5:
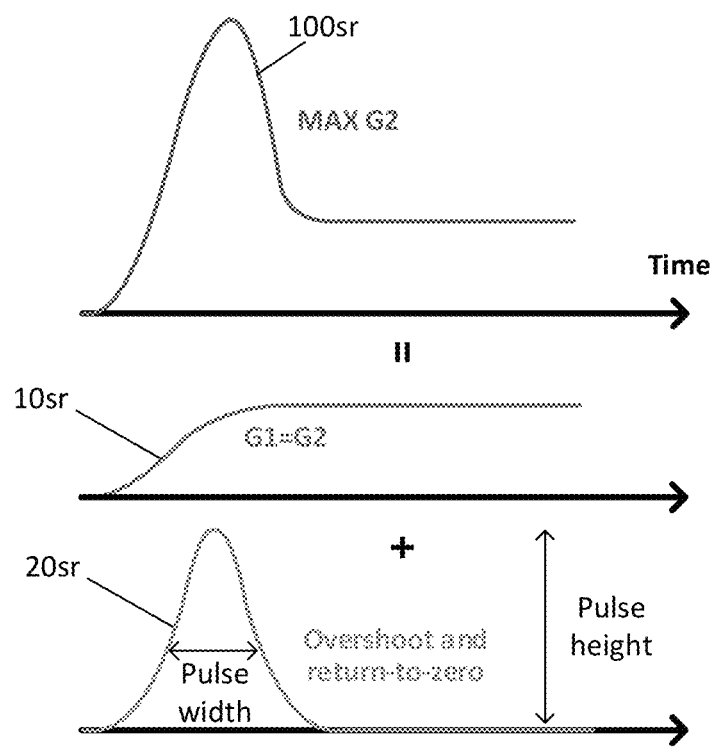
FIG. 5 shows the step responses of the first circuit path, the second circuit path and the combined output of the CTLE.

In some embodiments, a CTLE 100 may include at least a first circuit path 10, a second circuit path 20, and a summing circuit 30, as illustrated in FIG. 4. The first circuit path may be a wideband amplifier or a wideband equalizer. As shown in FIG. 5, the first circuit path 10 may have a step response 10sr that increases from an initial value to a steady state value. The second circuit path 20 may have a step response 20sr that increases from an initial value, peaks, and then falls to approximately the initial value. In some embodiments, the initial value and final value of the step response of the second circuit path may be zero or approximately zero. The term "approximately" in this context means within a range that is 20% of the pulse height or less, such as 10% or 5% of the pulse height. The outputs of the first and second circuit paths 10, 20 may be combined by summing circuit 30. As shown in FIG. 5, the CTLE 100 may have a combined step response of 100sr at the output of the CTLE 100, which may approximate the desired step response shown in FIG. 3. In some embodiments, the second circuit path 20 may handle fast transients with lower power consumption, allowing the CTLE 100 to have low overall power consumption. In some embodiments, and as discussed further below, the step response(s) of the first and second circuit paths 10, 20 may be adjustable, which can enable their step responses to be set appropriately for different communication standards or speeds.

Figure 6:
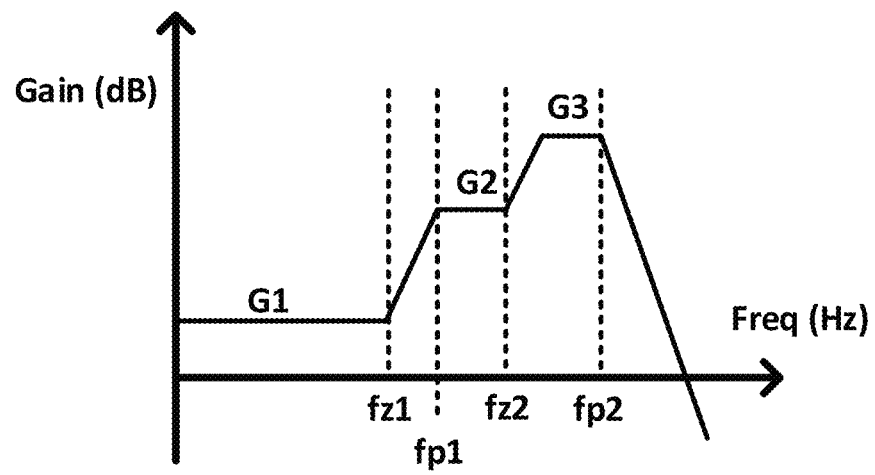
FIG. 6 shows an example of another desired step response, which includes a portion of constant gain between frequencies fp1 and fz2.
Figure 7:
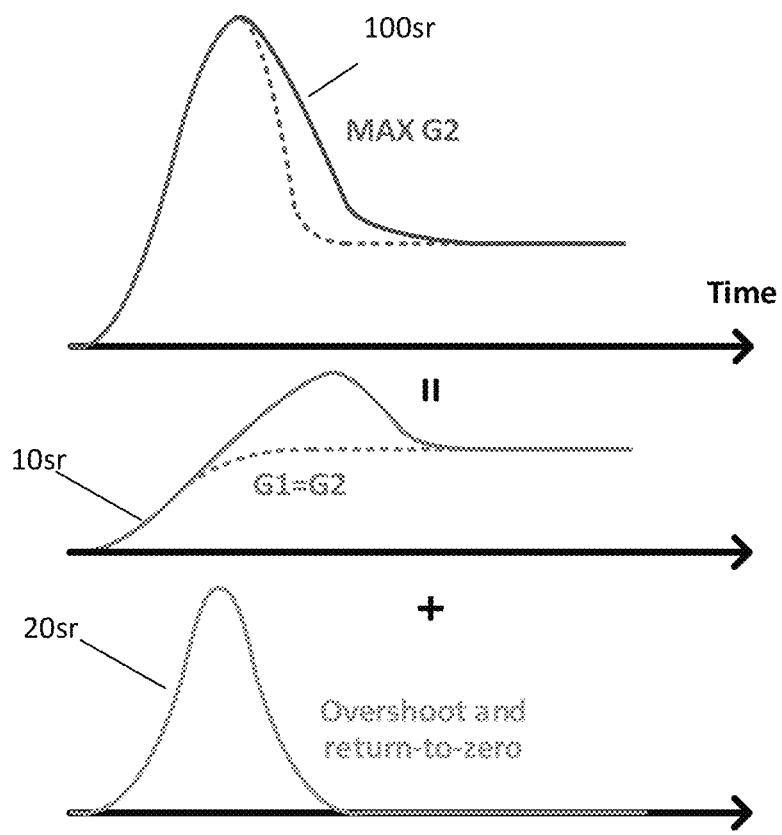
FIG. 7 shows the first circuit path 10 may be designed to have a step response that includes an overshoot.

FIG. 6 shows an example of another desired CTLE step response, which includes a portion of constant gain between frequencies fp1 and fz2. To approximate the desired step response shown in FIG. 6, the first circuit path 10 may be designed to have a step response 10sr that includes an overshoot, as shown in FIG. 7.

Figure 8:
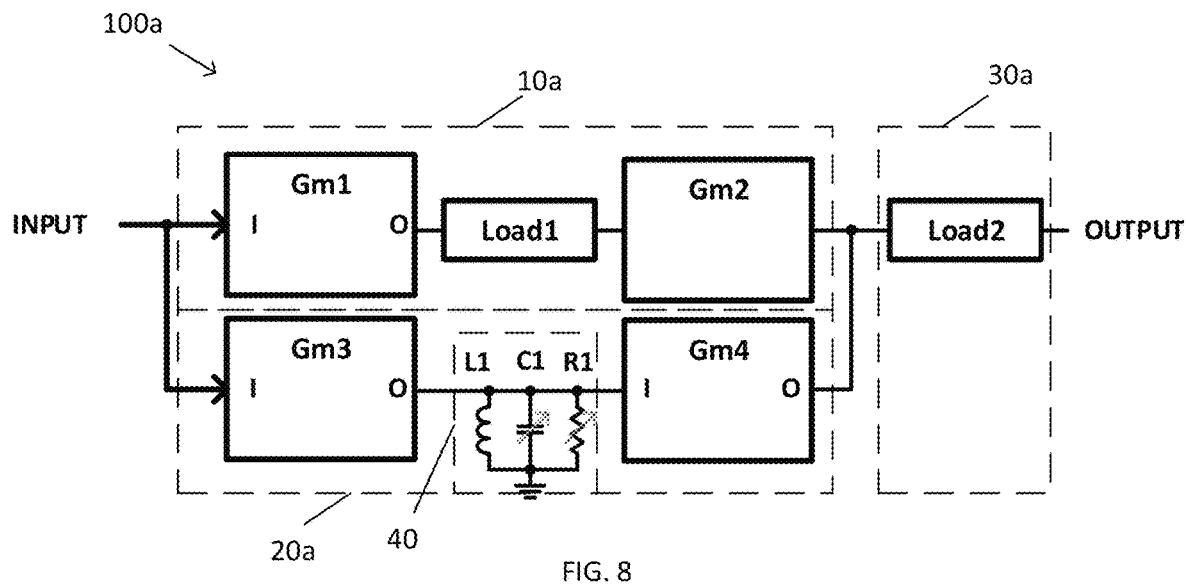
FIG. 8 shows an example implementation of a CTLE, according to some embodiments.

FIG. 8 shows an example implementation of a CTLE 100a, according to some embodiments.

The first circuit path 10a may include a Gm cell Gm1, followed by a load Load1 and a second Gm cell Gm2. Gm1 may perform a voltage to current conversion (with or without gain). The load Load1 may be any suitable load, and in some cases may be a resistor, for example, or a network including a combination of one or more resistors, capacitors and/or inductors. Load1 may convert the current signal from Gm1 into a voltage signal. Gm2 may receive the voltage signal from Load1 and convert it into a current signal to be summed by the summing circuit 30a, which in this case is a load Load2. In some embodiments, including both Load1 and Gm2 in the first circuit path 10a may help to reduce the timing mismatch with respect to the second circuit path 20a, which may be advantageous at high frequencies.

Figure 9:
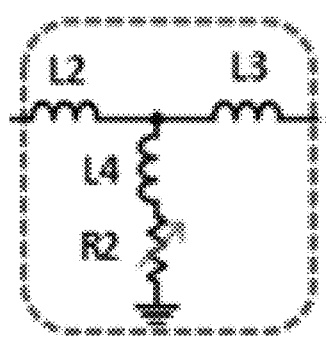
FIG. 9 shows an example of a summing circuit, according to some embodiments.
Figure 10:
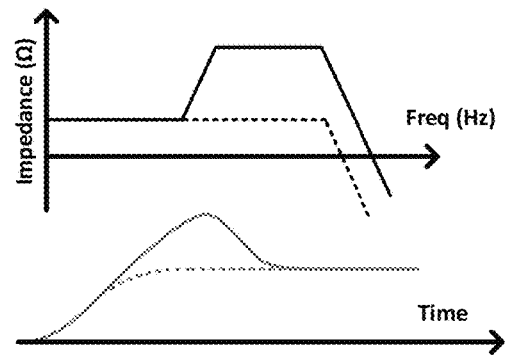
FIG. 10 shows an example of the step response and frequency response of the summing circuit of FIG. 9, including overshoot in the step response, according to some embodiments.

The second circuit path 20a may include a Gm cell Gm3, which may perform a voltage to current conversion (with or without gain). The current signal from Gm3 is received by a tank circuit 40 which in this case includes L1, C1 and R1 connected in parallel in a shunt path to ground. However, any configuration of circuit elements may be used in the tank circuit 40. The tank circuit 40 may produce the overshoot characteristic of the step response of the second circuit path 20, as illustrated in FIG. 5. In some embodiments, the second circuit path 20a may be programmable, such that the height and width of the step response 20sr may be varied. In the example of FIG. 8, the resistance R1 may be programmable to vary the step response. Specifically, varying the resistance R1 varies the pulse height of the step response (FIG. 5). A higher value of R1 produces a higher peak in the step response, while a lower value of R1 produces a step response with a smaller peak. The capacitance C1 may be programmable to vary the step response, specifically the pulse width of the step response (FIG. 5). A higher value of C1 produces a step response with a wider pulse width, while a lower value of C1 produces a step response with a smaller pulse width. The tank circuit 40 may produce a voltage signal, which is then received by Gm cell Gm4, which converts the voltage signal into a current signal. The current signals from both the first circuit path 10a and the second circuit path 20a are summed by the summing circuit 30a, which in this example is a load Load 2. Load 2 may be a resistor, a capacitor, an inductor, or any combination thereof. In some embodiments, Load 2 may be designed to produce a small overshoot in the step response. FIG. 9 shows an example of a load Load 2, according to some embodiments. FIG. 10 shows an example of the step response and frequency response of the summing circuit of Load 2, including overshoot in the step response, according to some embodiments.

In some embodiments, a plurality of the second circuit paths 20 may be connected in parallel. The insertion loss of the channel may be measured, and the strength (e.g., gain) of the second circuit paths may be set based on the measured insertion loss. In some embodiments, a plurality of second circuit paths may be connected in parallel, and one or more may be enabled and/or disabled based on the measured insertion loss.

Figure 11:
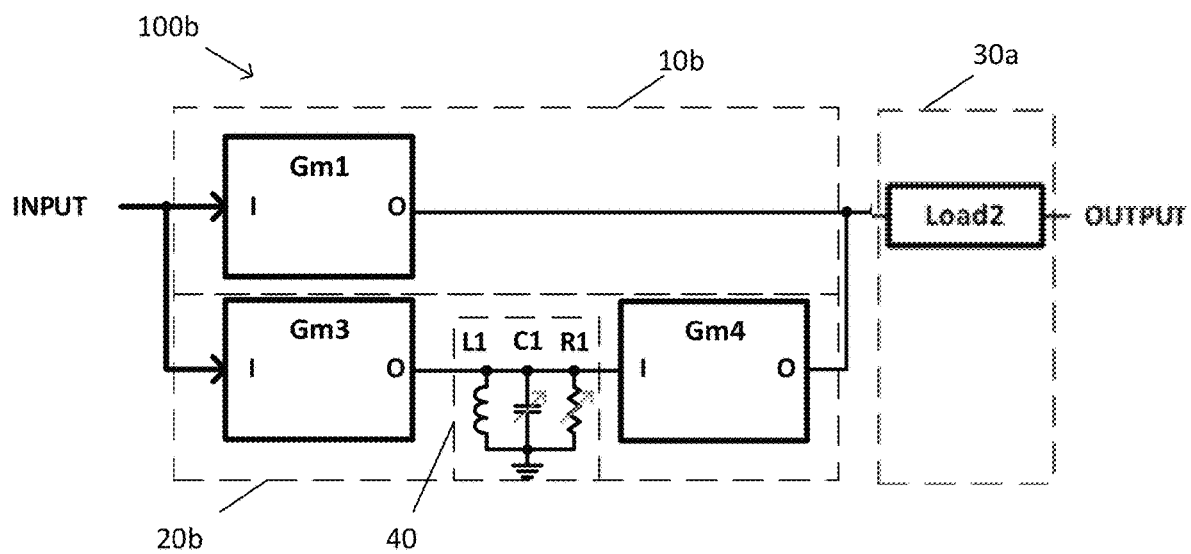
FIG. 11 shows another example implementation of a CTLE, according to some embodiments.

FIG. 11 shows another example implementation of a CTLE 100b, according to some embodiments. In this example, circuit path 10b may include Gm1, and may omit Load1 and Gm2 from the example of FIG. 8. Circuit path 20b may be the same or similar to that of circuit path 20a. Such an embodiment may include fewer components than the example of FIG. 8, and may be suitable for operation at lower frequencies, due to the mismatch between the delays introduced by circuit path 10b and circuit path 20b.

Any of the Gm cells shown in FIGS. 8 and 11 may have gain or no gain, depending on design considerations.

Figure 12:
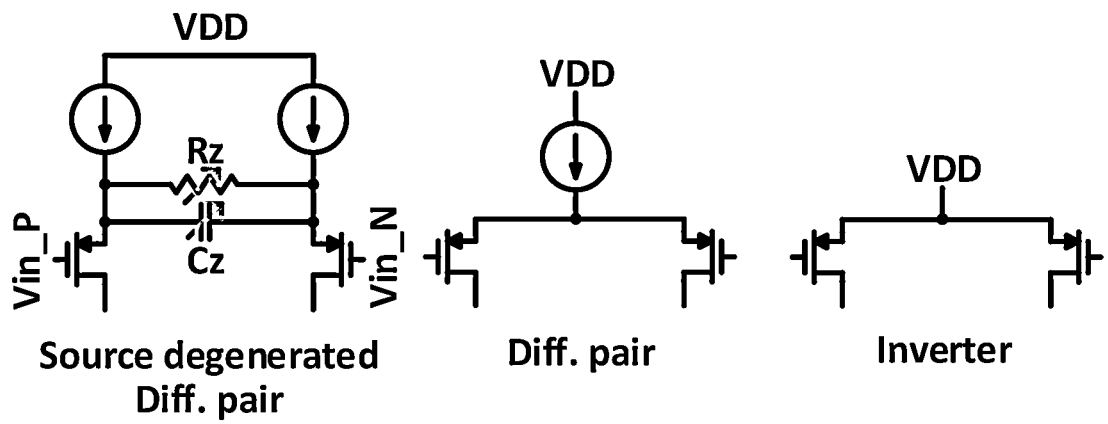
FIG. 12 shows examples of Gm cells, according to some embodiments.
Figure 12:
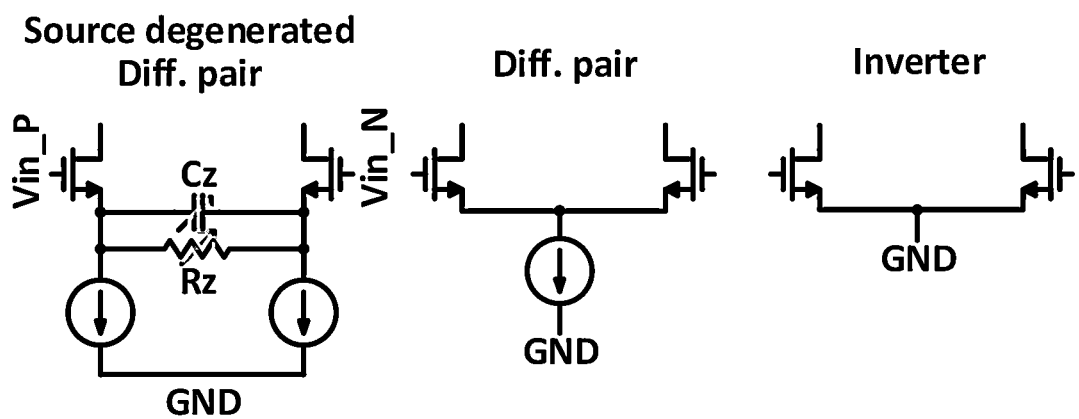

FIG. 12 shows examples of Gm cells, according to some embodiments. Any of the Gm cells shown in FIGS. 8 and 9 may be implemented by any of the Gm cells shown in FIG. 12, or by other Gm cells. In some cases, since a differential pair has high power efficiency, Gm cells Gm3 and/or Gm4 of circuit path 20 may be implemented as a differential pair, which reduces power consumption as circuit path 20 may handle high-frequency signals. Gm cells Gm1 and/or Gm2 of first circuit path 10 may be implemented by a source-degenerated differential pair, which may have high linearity.

Additional Aspects

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A continuous time linear equalizer (CTLE), comprising:
    a first circuit path having a step response that increases from a first initial value to a steady state value higher than the first initial value; and
    a second circuit path in parallel with the first circuit path, the second circuit path having a step response that increases from a second initial value to a peak and subsequently falls to a second steady state value that is approximately equal to the second initial value,
    wherein the CTLE is configured to combine an output of the first circuit path and an output of the second circuit path.

2. The CTLE of claim 1, wherein the CTLE is configured to receive a signal transmitted through a wired connection that provides a channel for the signal.

3. The CTLE of claim 2, wherein a frequency response of the CTLE is inversely proportional to a frequency response of the channel.

4. The CTLE of claim 1, wherein the step response of the first circuit path has an overshoot that peaks before falling to the steady state value.

5. The CTLE of claim 1, wherein the first circuit path includes a transconductance (Gm) cell.

6. The CTLE of claim 5, wherein the Gm cell performs a voltage to current conversion.

7. The CTLE of claim 6, wherein the Gm cell is a first Gm cell, and the first circuit path further includes:
    a first load coupled to an output of the first Gm cell; and
    a second Gm cell that receives a signal from the first load.

8. The CTLE of claim 5, wherein the Gm cell includes a source degenerated differential pair.

9. The CTLE of claim 1, wherein the second circuit path is programmable to vary the step response of the second circuit path.

10. The CTLE of claim 9, wherein the second circuit path includes a tank circuit.

11. The CTLE of claim 10, wherein the tank circuit includes a programmable resistance.

12. The CTLE of claim 11, wherein the programmable resistance sets a height of the step response of the second circuit path.

13. The CTLE of claim 10, wherein the tank circuit includes a programmable capacitance.

14. The CTLE of claim 13, wherein the programmable capacitance sets a pulse width of the step response of the second circuit path.

15. The CTLE of claim 10, wherein the second circuit path further includes a first Gm cell having an output coupled to the tank circuit, and a second Gm cell having an input connected to the tank circuit.

16. The CTLE of claim 15, wherein the first Gm cell and/or the second Gm cell comprises a differential pair.

17. The CTLE of claim 9, further comprising a summing circuit configured to combine the output of the first circuit path and the output of the second circuit path to produce a combined output.

18. The CTLE of claim 1, further comprising a summing circuit configured to combine the output of the first circuit path and the output of the second circuit path to produce a combined output.

19. A continuous time linear equalizer (CTLE), comprising:
    a first circuit path having a step response that increases from a first initial value to a steady state value higher than the first initial value; and
    a second circuit path in parallel with the first circuit path, the second circuit path having a step response with an overshoot,
    wherein the CTLE is configured to combine an output of the first circuit path and an output of the second circuit path.

20. The CTLE of claim 19, wherein the first circuit path comprises a wideband amplifier or a wideband equalizer.

* * * * *